United States Patent [19]
Allington

[11] 3,711,779
[45] Jan. 16, 1973

[54] APPARATUS FOR DETERMINING AND CHARACTERIZING THE SLOPES OF TIME-VARYING SIGNALS

[75] Inventor: Robert W. Allington, Lincoln, Nebr.

[73] Assignee: Instrumentation Specialties Company, Lincoln, Nebr.

[22] Filed: Nov. 17, 1970

[21] Appl. No.: 90,252

[52] U.S. Cl. ................................... 328/114, 328/132
[51] Int. Cl. ............................ H03k 5/20, H03k 5/18
[58] Field of Search...307/235, 235 A; 328/114, 132, 328/146, 151; 330/30 D

[56] References Cited

UNITED STATES PATENTS

| | | | |
|---|---|---|---|
| 3,119,070 | 1/1964 | Seliger | 328/114 |
| 3,119,984 | 1/1964 | Brandt et al. | 328/151 X |
| 3,116,458 | 12/1963 | Margopoulos | 328/151 |
| 2,834,883 | 5/1958 | Lukoff | 328/151 |
| 3,207,998 | 9/1965 | Corney et al. | 328/151 X |
| 3,390,347 | 6/1968 | Jones et al. | 328/151 X |
| 3,428,794 | 2/1969 | Norsworthy | 328/151 X |
| 3,553,492 | 1/1971 | Bugay | 307/235 |

Primary Examiner—John Zazworsky
Attorney—Vincent L. Carney

[57] ABSTRACT

At discrete time intervals, a clocked switch stores successive samples of a signal, whose slope is to be determined, across a capacitor. Amplifying means measure the capacitor charging current that changes the storage level at each interval. A positive or negative signal slope is sensed when the measured charging current exceeds predetermined positive or negative threshold levels. Logic means furnish outputs at separate terminals that indicate the slope to be positive, not positive, negative, not negative, most recently positive, and most recently negative.

17 Claims, 3 Drawing Figures

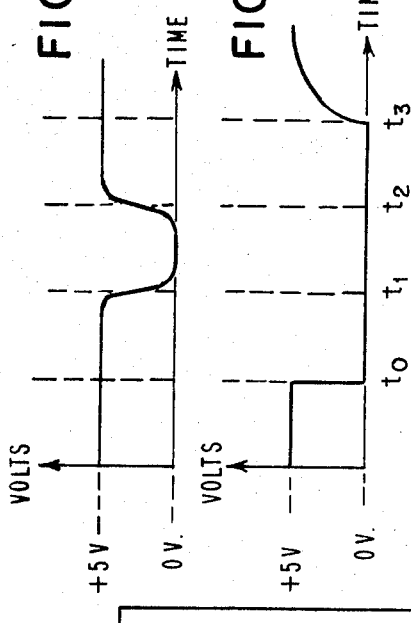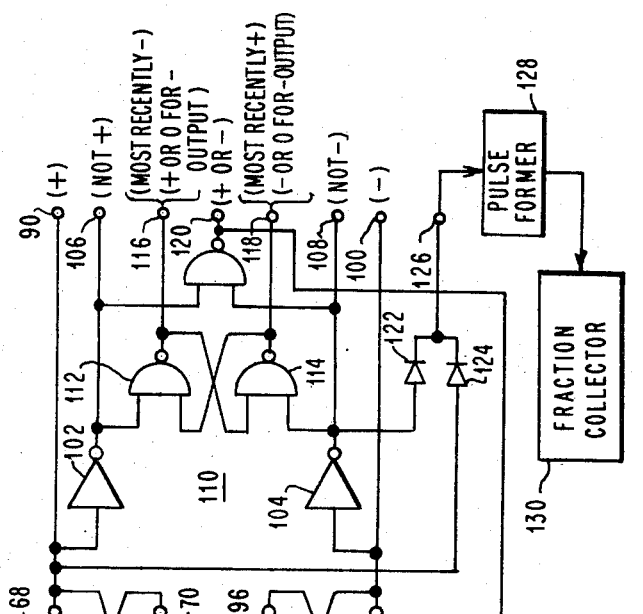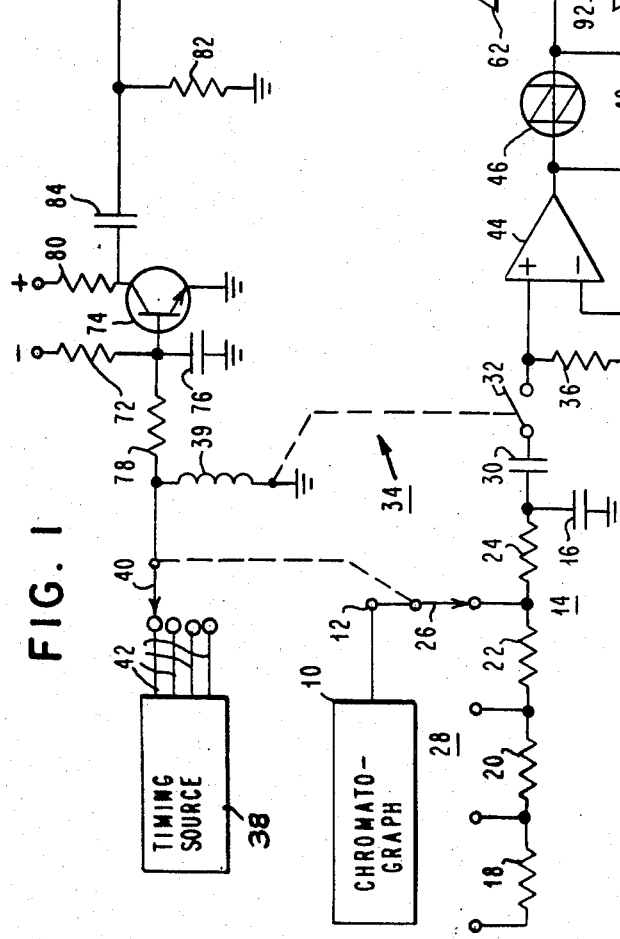

APPARATUS FOR DETERMINING AND CHARACTERIZING THE SLOPES OF TIME-VARYING SIGNALS

REFERENCES TO COPENDING APPLICATIONS

The following copending applications are referred to in this application. The content of these copending applications are hereby made a part of this application as if fully recited herein.

Application of Robert W. Allington and Herbert C. Griess entitled "Apparatus for Providing Optimum Measurement of Varying Chromatographic Peak Shapes" U.S. Ser. No. 90,247, assigned to the assignee of this application and being filed concurrently herewith.

Application of Robert W. Allington and Herbert C. Griess, entitled "Sample Hold and Subtract Circuit", U.S. Ser. No. 90,249, now U.S. Pat. No. 3,667,056, assigned to the same assignee as this application, and being filed concurrently herewith.

BACKGROUND OF THE INVENTION

This invention relates to signal analyzing apparatuses, particularly for determining and characterizing the slope or rate of change of time-varying electrical signals.

Apparatuses for determining and characterizing the slope of time-varying signals are frequently employed in the processing of the output signals of various chemical or physical test instruments, such as gas or liquid Chromatographs. With gas or liquid chromatographs, the output signals follow a base line interrupted by significant peaks. These peaks offer information concerning various components in the fluid mixture being tested.

Analyzing these peaks often requires determination of their heights. In other instances the areas bounded by the peaks and a base line are of interest. In those cases the signals representing the peaks are integrated. In other cases it is necessary to determine when the peaks occur. Also it is necessary to distinguish the peaks from extraneous peaks arising from noise, that is from extraneous undesired electrical variations having no significance in the tests being performed. Many analyses require information concerning the slope of the signals to be processed.

To obtain the slope of the signals being evaluated, analyzing systems frequently employ a resistor-capacitor network which produces a continuous analog potential corresponding to the differential of the signal being analyzed or evaluated. Systems using such resistor-capacitor slope-characterizing networks are often subject to inaccuracies because they fail adequately to reject responses of the test instruments to electrical noise. Also their analog slope characterizing networks are difficult to adapt to digital evaluating circuits and logic.

Moreover, in these systems the signals resulting from such slope-characterizing networks often furnish insufficient information concerning the character and history of the slope of the signal being evaluated to allow for decisive evaluation. They may also make the furnishing of such information more difficult. The sensitivity of such networks often presents a problem.

THE INVENTION

According to a feature of the invention, these disadvantages are obviated, by storing successive intermittent samples of the signal to be evaluated in storage means, and then sensing the changes in the successive values stored. Preferably clock signals control the sampling and storing.

According to another feature of the invention, threshold means respond to the changes in values stored by producing outputs when the changes sensed exceed predetermined values. Preferably the threshold means are bilateral for furnishing thresholds for positive and negative changes. Preferably the threshold means include means for varying the threshold level.

These features furnish a simple analysis and evaluation of the slope of a signal. Because the result is clocked and sampled, the analysis' output may be readily synchronized with a digital system. Preferably logic means furnish further information concerning the output voltages and its patterns of change.

According to still another feature of the invention, the means for sensing the change in the value stored include a polarized amplifier having a variable feedback. According to another feature the clock repetition is variable. These features increase the sensitivity of the sensing means and in conjunction with each other, control it.

According to yet another feature of the invention, clocking means form the clock signals in the form of repetitive pulses, and circuit means cause storage in the storage means during the repetitive pulses.

According to still another feature of the invention, memory means in the logic means and responsive to the sensing means establish a constant output voltage indicative of the change in the stored level, and the clocking means include delaying means for applying a delayed reset pulse to the memory means to reset it in the absence of changes in the stored level. Preferably second memory means in the logic means and also responsive to the sensing means establish output voltages indicative of a negative change in the stored level, and preferably third memory means in the logic means and responsive to the first and second memory means establish an output voltage indicative of whether the first and second memory means have indicated the change in stored level to be most recently positive or negative.

According to another feature of the invention the threshold means includes a triggered output furnishing a three level response. When the output exceeds a positive threshold level, it indicates a positive input signal slope; when it exceeds a negative threshold level, it indicates a negative input signal slope; and when the response lies between the thresholds, it indicates the absence of significant slope.

These and other features characterizing the invention are pointed out in the claims. Many objects and advantages of the invention will become obvious from the following detailed description when read in light of the accompanying drawing.

BRIEF DESCRIPTION OF THE DRAWING

FIG. 1 is a schematic diagram illustrating circuit embodying features of the invention;

FIG. 2 is a voltage-line graph of a voltage waveform used for clocking and resetting flip flops illustrated in FIG. 1; and FIG. 3 is a voltage-line graph illustrating the inverted output of a threshold device in FIG. 1.

DETAILED DESCRIPTION OF PREFERRED EMBODIMENT

In FIG. 1 a gas or liquid chromatograph 10 furnishes the varying-voltage signal that is ultimately to be integrated or otherwise processed by means not shown, and whose slope is to be determined and characterized by the means illustrated. The signal is applied to an input terminal 12 of the characterizing system according to the invention. A variable cutoff low-pass noise filter 14, composed of a filter capacitor 16 and four series connected resistors 18, 20, 22 and 24, reduces undesired electrical noise having a frequency spectrum higher than the frequencies of interest in the signal. An armature 26 of a multiple switch 28 selects the cutoff frequency of the filter by switching the resistors 20, 22, and 24 into and out of the filter 14. The thus filtered signal appears across the filter capacitor 16.

The filtered signal to be determined and characterized also appears at one end of a storing capacitor 30 which is connected to the signal carrying end of the filtercapacitor 16. A relay contact 32 of a repetitively actuated relay 34 intermittently and repeatedly closes a charging path across the capacitor 30, through a charging resistor 36. The repetition rate at which the relay contact 32 closes the path to the capacitor 39 is determined by a multiple output clock or timing source 38. The latter energizes the relay coil 39 of the relay 34 with intermittent timing pulses or clock signals through a multicontact switch 40 at a repetition rate that depends upon the position of the switch 40. As shown in FIG. 1, the source output lead selected by the switch 40 furnishes the highest repetition frequency of the four timing signal leads 42 from the timing source. The other three leads provide successively slower clock signals.

The switch 40 is mechanically ganged to the armature 26. Setting the switch 40 set for slower clock signals by moving it to the other positions moves the armature 26 so as to sequentially add resistors 22, 20, and 18 in series with the resistor 24. This lowers the cut-off frequency of the low pass filter 14. The switch 40 is normally set so that somewhere on the order of 10 to 40 clock signals or clock pulses occur during each chromatographic peak.

During each clock pulse the contact 32 closes and charges or discharges the charging capacitor 30 to the value of the signal voltage across the capacitor 16. The time constant of capacitor 30 and resistor 36 is sufficiently small to allow current through the resistor 36 to charge or discharge the capacitor 30 to the level of the filtered signal across capacitor 16 during the clock pulse. The capacitance of capacitor 30 is small compared to capacitor 16. This allows capacitor 30 to charge and discharge much more than capacitor 16. Between clock pulses the contact 32 is open and the capacitor 30 disconnected. The capacitor then stores or retains the charge of the signal voltage level that appeared across filter capacitor 16 during the previous clock pulse. Between pulses the charge across capacitor 16 changes with the filtered signal input voltage. At the next clock pulse, the capacitor 30 charges or discharges to the level of the new filtered signal voltage across capacitor 16. This change in charge occurs by passage of current through the resistor 36. When current flows in the resistor 36 in one direction, this indicates an upward change in signal level, in the other direction a downward change. If there has been no change or no appreciable change in signal level, then no change in the voltage charge across capacitor 16 occurs and no current flows through resistor 36 during the clock pulse. This is so because the charge across capacitor 30 is, at the start of the clock pulse, the same as across capacitor 16. The currents through the resistor 36 thus are indications of change in signal level.

A noninverting operational amplifier 44 senses the voltage developed by the current through the resistor 36. A bilateral "four-layer" diode 46 blocks those portions of the output voltage of amplifier 44 which are less than its positive or negative breakdown potential. It applies across the resistor 48 those portions of the output voltage of amplifier 44 which exceed its positive or negative breakdown potential. Thus if there has been a change in the filtered signal level at capacitor 16 between one clock pulse and the next greater than the predetermined positive or negative threshold value an output pulse appears across resistor 48.

The predetermined threshold value necessary for producing an output pulse across resistor 48 is determined by the closed loop gain of the operational amplifier 44 and the breakdown voltage of the four-layer diode. This threshold level may be adjusted by varying a switch 50 that selects a tap in a negative feedback voltage divider composed of series-connected resistors 52, 54, 56 and 58. The negative feedback is applied through a resistor 60 to an input terminal of the amplifier 44. In the position shown for the switch 50, the negative feedback is maximum. For this position, a relatively large amount of voltage must appear across resistor 36, and hence there must be a relatively large change in input signal level, in the interval from clock pulse to clock pulse, for the output voltage of the operational amplifier 46 to exceed the breakdown voltage of the four-layer diode 46. Adjustment of switches 26 and 40 in cooperation with adjustment of switch 50 sets the slope sensitivity of the system. Longer clock intervals set by switch 40 and lower threshold levels by switch 50 increase the slope sensitivity. Noise rejection can be improved and the expense of time resolution accuracy for a given slope sensitivity, by using longer clock intervals and less threshold sensitivity. Thus a very flexible slope-sensitivity control is provided by the invention.

The voltage waveform across resistor 48 is a pulse of a time duration approximately equal to that of the clock pulse. The polarity of the pulse across resistor 48 is positive going for increasing signal voltage or positive slope at terminal 12. The pulse is negative going for negative slopes, i.e. decreasing voltage levels at terminal 12.

An amplifying and clipping inverter 62 clips the pulses appearing at the resistor 48 and inverts them. A flip-flop 66 receives the clipped and inverted pulses. A sample of the pulse shape of the inverted pulses at the input to flip-flop 66 appears in FIG. 3. Shown is a negative going pulse that has a transition form +5 volt level to a 0 volt level. Because of the clipping action of the inverter 62 and the switching action of diode 46 the pulse at the output of inverter 62 has the same magnitude regardless of whether the slope exceeds the threshold values slightly or greatly. The pulse coincides approximately in time with the clock pulse from source 38.

Forming the flip-flop 66 are two cross connected gates 68 and 70. The gates 68 and 70 and similarly drawn gates are conventional logic elements commonly used in integrated circuit logic systems, for example, so-called NAND gates. They may be any conventional type such as DTL or TTL. Each NAND gate produces a positive output potential in response to the presence of at least one negative signal on its inputs. With positive potentials at both inputs, the NAND gate produces a negative output potential. In the context of the logic herein the term positive refers to a potential of +5.0 volts and the term negative a potential of zero or near zero volts. Thus a negative going pulse is one that starts at +5.0 volts, drops to 0 or near 0 volts, and rises again to +5.0 volts. A "negative" logic signal or potential or level is 0 or near 0 volts. Similarly a positive pulse is a pulse that goes from 0 or near 0 volts to 5 volts, to 0 or near 0 volts. A positive logic signal or potential or level is +5.0 volts.

The flip-flop 66 is set to one of its two stable states by a negative going set pulse that occurs with each clock pulse. Such a set pulse appears in FIG. 2. It is derived at switch 40 from the positive clock pulse that starts at the time shown as $t_0$ in FIGS. 2 and 3. A negatively connected resistor 72 normally biases the base of an emitter grounded NPN transistor 74 into non-conductive condition. The positive clock pulse slowly charges a grounded base-connected capacitor 76 through a resistor 78. At time $t_1$ the charge on capacitor 76 reaches predetermined level and transistor 74 conducts through a collector resistor 80. This reduces the voltage at the collector of transistor 74 as well as across a resistor 82 and at the bottom input of gate 70. It forms the set pulse whose start is delayed. The set pulse ends sooner than the clock pulse at time $t_2$ as a coupling capacitor 84 charges through the resistor 82 beyond a given level.

The set pulse occurs regardless of the slope detected by resistor 48. The negative potential, i.e. 0 volts, of the set pulse at the input of gate 70 produces a positive output potential and a positive input to gate 68.

In the absence of a slope and hence a potential across resistor 48, the output of amplifying inverter 62 is positive (+5 volts). The other input to gate is also positive. This places a near zero potential at the output of gate 68 and at an output terminal 90.

The negative potential at the output of gate 68 also appears at the other input of gate 70. Return of the lower input of gate 70 to a positive potential now fails to change the stable condition of the flip-flop because the top negative input to gate 70 keeps its output positive. The set pulse has thus set flip-flop 66. The output of terminal 90 is near zero.

The arrival of a negative pulse from inverter 62 indicates a positive change in signal level beyond the preset threshold level. The negative pulse, because it preceeds the start of the set pulse at resistor 82 flips the flip-flop by turning the output of gate 68 positive. The negative pulse from inverter 62 keeps the output of the gate 68 and terminal 90 positive even during the set pulse. After the set pulse, but during the negative logic pulse at inverter 62, the inputs to gate 70 are both positive. The inputs to gate 68 are both negative. Thus the end of the negative logic pulse leaves a positive potential at the output of gate 68. This potential also appears at the output terminal 90. Thus a positive voltage (5 volts) at terminal 90 indicates a positive slope in the filtered signal being tested.

If the slope returns to 0 or becomes negative, the positive level at the top of gate 68 and the negative set pulse flip the flip-flop and return the output at terminal 90 to near 0.

In response to a negative slope, two cascaded amplifying and clipping inverters 92 and 94 clip and twice invert a negative pulse at resistor 48. Thus a negative pulse appears at flip-flop composed of gates 96 and 98. This flip-flop produces a positive output at a terminal 100 in response to a negative slope at the filtered input signal at capacitor 16. Upon return to no slope or positive slope, the flip-flop composed of gates 96 and 98 produces a near zero potential at terminal 100. When potentials at terminals 90 and 100 are both near zero, this indicates that the slope is not positive and not negative but nearly flat.

Inverters 102 and 104 invert the signals at terminals 90 and 100. Thus positive signals (5 volts) at a terminal 106 indicate absence of positive slopes at the chromatographic signal being analyzed. A positive signal at a terminal 104 connected to the output of inverter 100 indicates absence of a negative slope in the chromatographic signal.

A flip-flop 110 composed of gates 112 and 114 receives inputs from the terminals 106 and 108. A negative (i.e. near zero) voltage at terminal 106 or 108 causes the flip-flop 110 to switch into a state agreeing with this voltage. That is, if terminal 106 goes negative, i.e. drops to near zero, thereby indicating a positive slope at capacitor 16, the inputs to gate 112 are both negative and the inputs to gate 114 both positive, thus output terminal 116 becomes positive and terminal 118 negative (i.e. near zero). Terminals 116 and 118 remain in this condition even if the input slope becomes zero. This is so because the voltages at terminals 106 or 108 are then both positive. One input to gate 112 is then negative and both to gate 114 are positive. This produces no change in output. If the slope at capacitor 16 becomes negative, the voltage terminal 108 drops to near zero. This switches the flip-flop 110 so that terminal 118 is positive and terminal 116 negative (near zero). Thus although the slope at capacitor 16 may become zero, the terminals 116 and 118 remain at the potentials set at the last positive or negative slope. Thus terminals 116 and 118 furnish a memory function that indicates whether the slope at capacitor 16 was either positive or negative prior to the zero slope.

A gate 120 receives inputs from terminals 106 and 108. It produces a positive output on a terminal 120 when the input signal slope is either positive or negative. It produces a negative (near zero) output only when the slope is near zero.

Two diodes form a gate that couples the terminals 108 and 90 together. A positive pulse at a terminal 126 indicates that the slope is either starting positive or ceasing negative, thus defining a chromatographic peak. The terminal 126 actuates a pulse former 128 that operates a fraction collector 130 in such a way as to deposit separate discrete, chromatographic peaks into collecting tubes, in a manner similar to that described in Allington U.S. Pat. No. 3,202,188. This output could also be used for providing a scale-charge control signal for a digital integrator to apply different weighing factors to different successive peaks.

Terminals 90, 106, 116, 120, 118, 108, and 100 may be used to control a digital integrator.

Functions of integrator control that can be derived from these terminals are the starting and stopping of circuitry to "track" or compensate for drifting electrical base line at the signal input, printing or recording of the integral; storage, printing, or recording of the time occurance of a chromatographic peak in order to provide retention time information, etc. Such uses are suggested in the beforementioned copending applications of Robert W. Allington and Herbert C. Griess, filed on even date herewith and assigned to the same assignee as this application.

In operation the filter system 14 applies a filtered input signal from a chromatograph 10 across the capacitor 16. The filter 14 helps eliminate electrical noise. The interruptor relay 34 intermittently applies the filtered signal voltage across the capacitor 30. The latter stores this signal voltage between applications. At each application, if there has been a change in signal potential at capacitor 16 charging current passes through the resistor 36. The amplifier amplifies the voltages formed by the charging currents. If the thus amplified voltages representing charging currents are sufficiently large to exceed the thresholds formed by the four-layer diode 46, the latter passes the voltages indicating minimum slope level to a logic system 62 to 126. The latter then forms positive signals indicative of positive slope, not positive slope, the most recent measured non-zero slope has been negative, slope is positive or negative, the most recent measured non-zero slope is positive, not negative slope, negative slope, and positive or not negative slope. The invention contemplates providing for the establishment of a fixed, instantaneous level over which the input voltage must swing. A very small, yet very fast swing of the input voltage to this apparatus has no effect, although the instantaneous slope or voltage rate of change at this time might be quite large. This provides a degree of rejection of response to electrical noise.

The invention furnishes a simple flexible and repeatable means for determining and characterizing the slope of the electrical signal. It furnishes an adjustable threshold level for rejecting insignificant signal voltage swings. This reduces the effect of electrical noise. Apparatus according to the invention may be readily synchronized with operations taking place in other parts of a digital system because the electronic differentiator embodying the invention may be timed or clocked in synchronism with such a system.

The circuit of FIG. 1 may be altered to provide additional filtering, coupling, or decoupling circuits to decrease spurious responses. Different methods of interfacing proper logic voltage levels may be provided.

While embodiments of the invention have described in detail, it will be obvious to those skilled in the art that the invention may be embodied otherwise without departing from its spirit and scope. For example, the sensitivity to negative slopes can be made greater than the sensitivity to positive slopes by diode 150 and resistor 152. The negative feedback on amplifier 44 is less for negative pulses, since diode 150 will not conduct. Also, the slope sensitivity can be increased after a slope is detected, in order to improve noise rejection and decrease instability. When a slope is present, the contacts of relay 153 close, decreasing the negative feedback because of the signal drain through resistor 151.

What is claimed is:

1. An apparatus for analyzing the rate of change of a signal, comprising a capacitor, input means for applying the signal to be analyzed to one side of said capacitor, clocking means for furnishing repetitive pulses, a resistor, switch means responsive to said clocking means for repetitively establishing the voltage of said input means across the capacitor and said resistor so that as the input signal changes from repetition to repetition current passes through the resistor, sensing means for sensing the magnitude and direction of current through said resistor and threshold means for furnishing a voltage when the current through the resistor exceeds a given positive or negative level.

2. An apparatus as in claim 1 further comprising a plurality of output terminals, and logic means for establishing at respective ones of said output terminals signals indicating that the rate of charge is positive, negative, or almost zero.

3. An apparatus as in claim 1, where the said sensing means include memory means responsive to the changes of signal level for establishing an output voltage indicative of the change in level, thereby also being indicative of the slope of the input signal.

4. An apparatus as in claim 1, further including means sensitive to slope polarity for making the apparatus more sensitive to negative input signal slopes than to positive input signal slopes.

5. An apparatus as in claim 3, further including means sensitive to slope polarity for making the apparatus more sensitive to negative input signal slopes than to positive input signal slopes.

6. An apparatus as in claim 4, wherein said means sensitive to slope polarity functions by increasing the sensitivity of the said sensing means to changes which correspond to negative input signal slopes.

7. An apparatus as in claim 1 wherein said sensing means include means for varying the threshold level at which output is produced.

8. An apparatus as in claim 7 wherein said sensing means include a polarized amplifier having variable feedback.

9. An apparatus for evaluating the slope of a signal, comprising input means for carrying the signal whose slope is to be evaluated, storage means for storing a value corresponding to a signal applied thereto, clocking means, circuit means responsive to said clocking means for intermittently applying the signal of said input means to said storage means at successive moments so as to store successive values therein, and sensing means for sensing the change in value stored in said storage means, said sensing means including a threshold means for producing an output when the change sensed by said sensing means exceeds a predetermined value, said sensing means including memory means responsive to the changes of signal level for establishing an output voltage indicative of the change in level, and said clocking means including pulse delaying means for applying a delayed reset pulse to said memory means.

10. An apparatus as in claim 9, wherein said sensing means include second memory means responsive to changes of signal level for establishing an output voltage indicative of the change in level, said second memory means being responsive to said clocking means.

11. An apparatus as in claim 9, wherein said memory means includes a flip-flop.

12. An apparatus as in claim 9, wherein said pulse delaying means shorten said pulse.

13. An apparatus as in claim 10, wherein said sensing means further include third memory means responsive to said first and second memory means for indicating whether said first and second memory means have indicated the slope to be most recently positive or negative.

14. An apparatus for evaluating the slope of a signal, comprising input means for carrying the signal the slope of which is to be evaluated, storage means for storing a value corresponding to a signal applied thereto, circuit means for intermittently applying the signal of said input means to said storage means at successive separated moments so as to store successive values therein, whereby said values stored in said storage means are changed during said successive separated moments by amounts corresponding to changes in the signal between said separated moments and sensing means for sensing the change in value stored in said storage means between pairs of said successive separated moments, whereby changes in the signal are detected, wherein said sensing means includes fraction means responsive to level changes to which a fraction collector responsive to said fraction means may be connected.

15. An apparatus for evaluating the slope of a signal, comprising input means for carrying the signal whose slope is to be evaluated, storage means for storing a value corresponding to a signal applied thereto, clocking means, circuit means responsive to said clocking means for intermittently applying the signal of said input means to said storage means at successive moments so as to store successive values therein, and sensing means for sensing the change in value stored in said storage means, said sensing means including a threshold means for producing an output when the change sensed by said sensing means exceeds a predetermined value, said sensing means including memory means responsive to the changes of the signal level for establishing an output voltage indicative of the change in level, thereby also being indicative of the slope of the input signal, said memory means controlling hysteresis means which increase the sensitivity of said apparatus to input signal slopes when the said memory means establishes an output voltage indicative of the change in level due to the detection of a slope.

16. An apparatus as in claim 15, wherein the said increase in sensitivity is accomplished by increasing the sensitivity of the sensing means.

17. An apparatus for evaluating the slope of a signal, comprising input means for carrying the signal the slope of which is to be evaluated, storage means for storing a value corresponding to a signal applied thereto, circuit means for intermittently applying the signal of said input means to said storage means at said successive separated moments so as to store successive values therein, whereby said values stored in said storage means are changed during said successive separated moments by amounts corresponding to changes in the signal between said separated moments, and sensing means for sensing the change in value stored in said storage means between pairs of said successive separated moments, whereby changes in the signal are detected, said storage means including a capacitor, whereby said storage means stores an amount of electrical charge sufficient to provide a potential corresponding to a signal applied thereto; said circuit means including switch means for connecting said capacitor in a complete circuit with said input means during said successive separated moments, whereby current flows through said capacitor in a first direction if said input means has a potential higher than that provided by said storage means and in a second direction if said input means has a lower potential than that provided by said storage means, said sensing means including means for sensing the direction of the current, whereby said sensing means detects that the signal at the input means during the first of two successive separated moments is larger than the signal at the input means during the second of two successive separated moments when the current flows in said first direction and is lower than the signal at the input means during the second of two successive separated moments when the current flows in said second direction.

* * * * *